US012472970B2

(12) United States Patent
Sugimoto

(10) Patent No.: US 12,472,970 B2
(45) Date of Patent: Nov. 18, 2025

(54) INFORMATION PROVIDING APPARATUS AND SYSTEM

(71) Applicant: Honda Motor Co., Ltd., Tokyo (JP)

(72) Inventor: Yoshiaki Sugimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 18/372,749

(22) Filed: Sep. 26, 2023

(65) Prior Publication Data

US 2024/0116528 A1 Apr. 11, 2024

(30) Foreign Application Priority Data

Sep. 29, 2022 (JP) ................................ 2022-155820

(51) Int. Cl.
*B60W 50/14* (2020.01)
*B60W 40/02* (2006.01)
*B60W 40/105* (2012.01)
*B60W 50/02* (2012.01)

(52) U.S. Cl.
CPC ............ *B60W 50/14* (2013.01); *B60W 40/02* (2013.01); *B60W 40/105* (2013.01); *B60W 50/0205* (2013.01); *B60W 2050/0215* (2013.01); *B60W 2050/146* (2013.01); *B60W 2552/53* (2020.02); *B60W 2554/80* (2020.02); *B60W 2555/20* (2020.02); *B60W 2556/20* (2020.02); *B60W 2556/40* (2020.02); *B60W 2556/50* (2020.02)

(58) Field of Classification Search
CPC .... B60W 50/14; B60W 40/02; B60W 40/105; B60W 50/0205; B60W 2050/0215; B60W 2050/146; B60W 2552/53; B60W 2554/80; B60W 2555/20; B60W 2556/20; B60W 2556/40; B60W 2556/50; B60W 2050/021; B60W 2556/65; H04W 4/02; H04W 4/44

See application file for complete search history.

(56) References Cited

U.S. PATENT DOCUMENTS

2018/0004211 A1* 1/2018 Grimm ................ G05D 1/0066

FOREIGN PATENT DOCUMENTS

JP 2005164492 A 6/2005

* cited by examiner

*Primary Examiner* — Brian A Zimmerman
*Assistant Examiner* — Cal J Eustaquio
(74) *Attorney, Agent, or Firm* — Duft & Bornsen, PC

(57) ABSTRACT

An information providing apparatus including a microprocessor and a memory storing a map information including a road map. The microprocessor is configured to perform: acquiring from an in-vehicle device, driving information including position information indicating the position of a vehicle detected by a first sensor and measurement error information indicating an occurrence of a measurement error output by a second sensor measuring an external environment of the vehicle, and further acquiring the map information from the memory; determining whether a snowfall has occurred in a predetermined region of the road map, based on the driving information and the map information; and outputting information in which a determination result is associated with the road map. The determining includes when recognizing that the measurement error has occurred while the vehicle is traveling in the predetermined region, determining that the snowfall has occurred in the predetermined region.

8 Claims, 6 Drawing Sheets

INFORMATION PROVIDING APPARATUS AND SYSTEM

CROSS-REFERENCE TO RELATED APPLICATION

This application is based upon and claims the benefit of priority from Japanese Patent Application No. 2022-155820 filed on Sep. 29, 2022, the content of which is incorporated herein by reference.

BACKGROUND OF THE INVENTION

Field of the Invention

The present invention relates to information providing apparatus and system configured to provide weather information about a road.

Description of the Related Art

As an apparatus of this type, there has been conventionally known an apparatus configured to extract a measurement point that satisfies a condition of a stopped object from among measurement points that have been detected by a millimeter-wave radar mounted on a host vehicle, and to determine the weather in the surroundings of the host vehicle, based on the number of the extracted measurement points (for example, see JP 2005-164492 A).

However, there are enormous number of measurement points detected by a sensor such as a millimeter wave radar. Hence, in a case where the weather is determined by using the information of the measurement points of the millimeter wave radar like the apparatus described in JP 2005-164492 A, the processing load of the apparatus may be increased. In addition, a storage area for accumulating the information of the measurement points is needed, and the scale of the apparatus may be increased.

SUMMARY OF THE INVENTION

An aspect of the present invention is an information providing apparatus including: a communication unit communicable to an external device; a microprocessor; and a memory coupled to the microprocessor. The memory stores a map information including a road map. The microprocessor is configured to perform: acquiring from an in-vehicle device mounted on a vehicle which is traveling and including a first sensor detecting a position of the vehicle and a second sensor measuring an external environment of the vehicle via the communication unit, driving information including position information indicating the position of the vehicle detected by the first sensor and measurement error information indicating an occurrence of a measurement error output by the second sensor, and further acquiring the map information from the memory; determining whether a snowfall has occurred in a predetermined region of the road map, based on the driving information and the map information acquired in the acquiring; and outputting to an output apparatus via the communication unit, information in which a determination result in the determining is associated with the road map. The microprocessor is configured to perform the determining including when recognizing that the measurement error has occurred while the vehicle is traveling in the predetermined region, based on the map information and the driving information, determining that the snowfall has occurred in the predetermined region.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
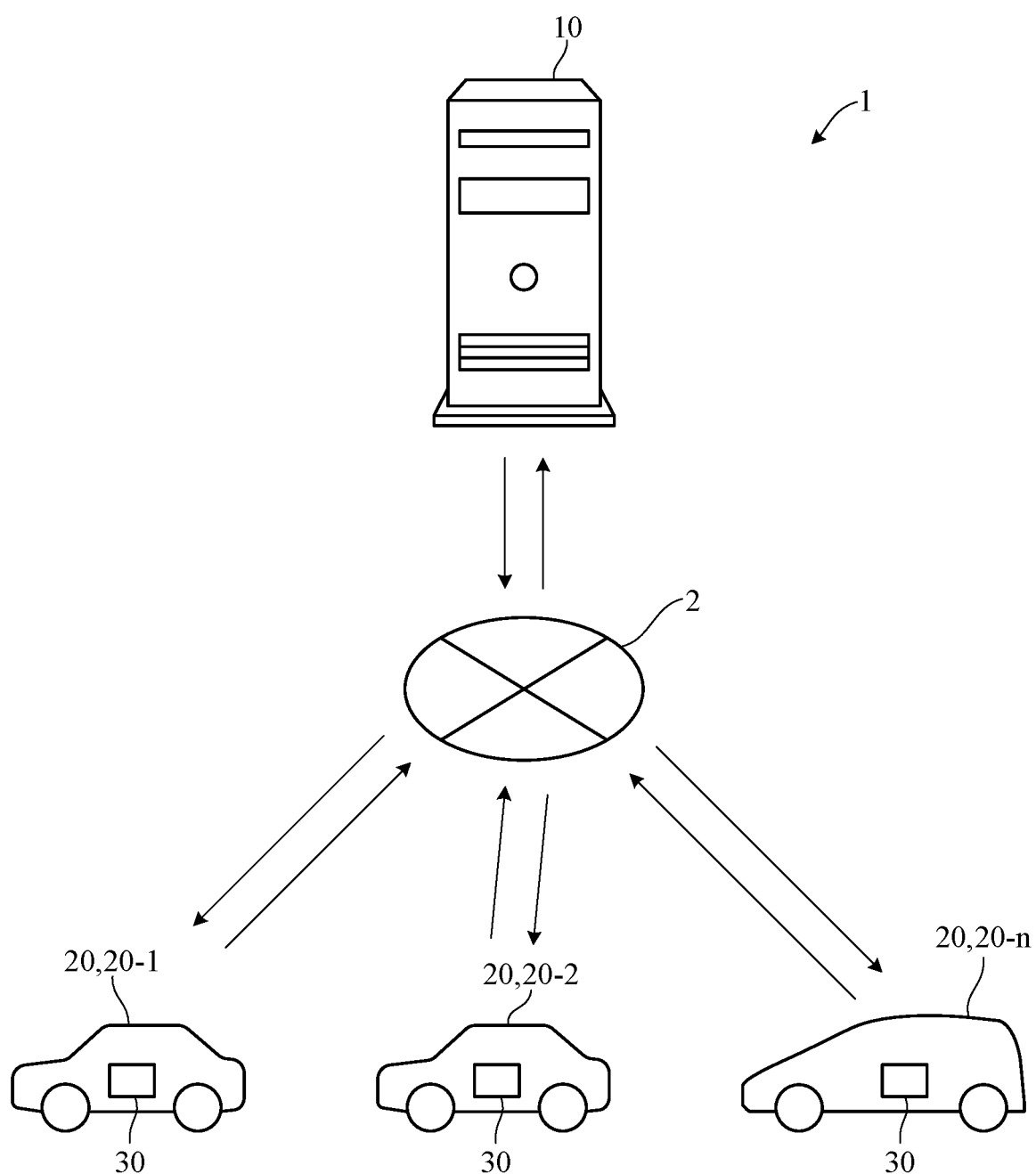
FIG. 1 is a diagram illustrating an example of a configuration of an information providing system including an information providing apparatus according to the present embodiment.

Hereinafter, embodiments of the present invention will be described with reference to FIGS. 1 to 6B. An information providing apparatus according to an embodiment of the present invention is an apparatus for providing weather information about a road on which a vehicle has traveled or is traveling, particularly, presence or absence of an occurrence of snowfall. FIG. 1 is a diagram illustrating an example of a configuration of an information providing system including the information providing apparatus according to the present embodiment. As illustrated in FIG. 1, an information providing system 1 includes an information providing apparatus 10 and an in-vehicle device 30. The information providing apparatus 10 is configured as a server apparatus. The in-vehicle device 30 is configured to be communicable with the information providing apparatus 10 through a communication network 2.

The communication network 2 includes not only a public wireless communication network represented by the Internet network, a mobile telephone network, or the like, but also a closed communication network provided for every predetermined management region, for example, a wireless LAN, Wi-Fi (registered trademark), Bluetooth (registered trademark), or the like.

The in-vehicle device 30 is mounted on a vehicle 20. The vehicles 20 includes a plurality of vehicles 20-1, 20-2, . . . , 20-n. Note that the vehicle 20 may be a manually driven vehicle or an automatically driven vehicle. In addition, the vehicles 20 may include vehicles having different vehicle types or grades.

Figure 2:
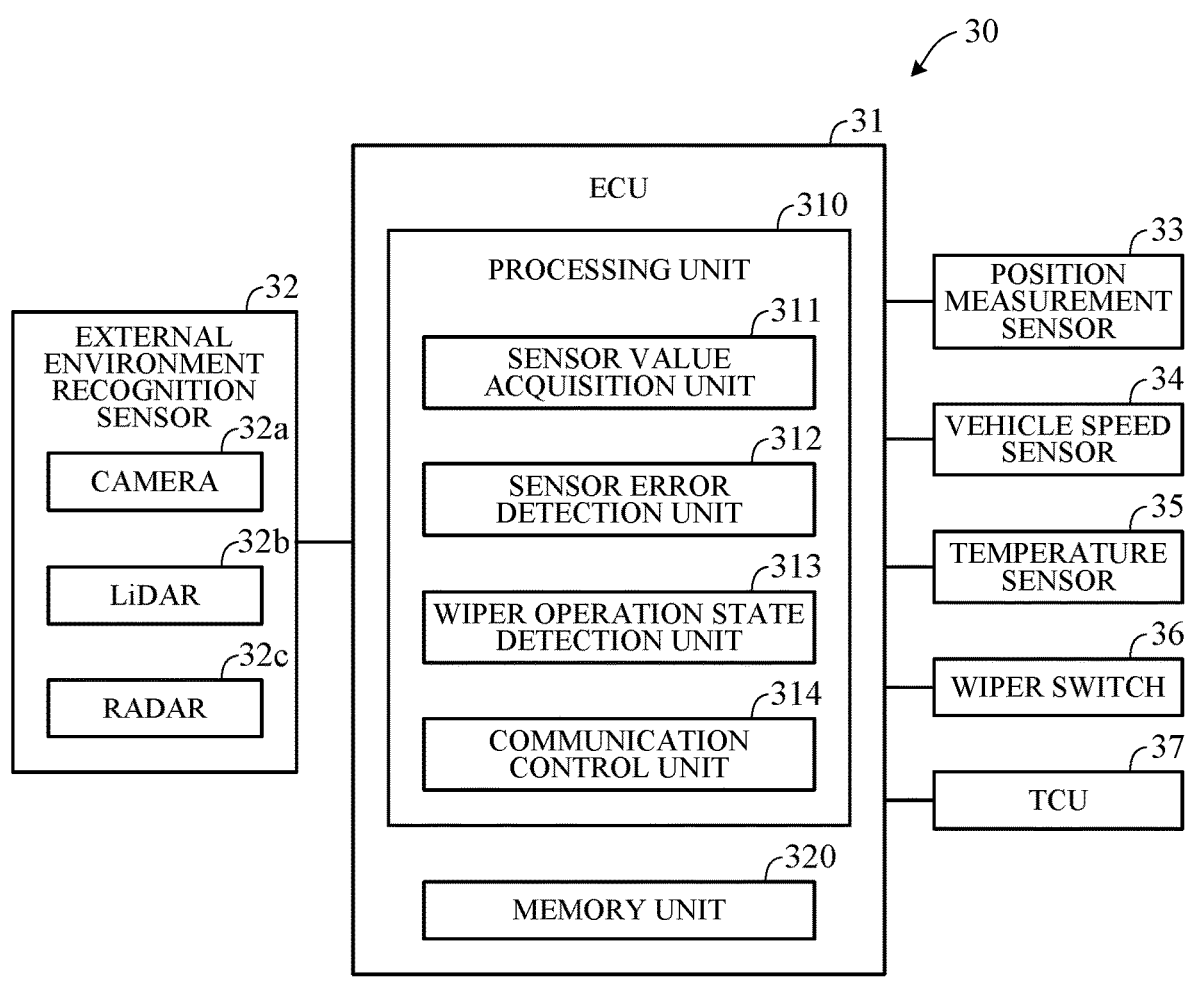
FIG. 2 is a block diagram illustrating a configuration of main components of the in-vehicle device of FIG. 1.

FIG. 2 is a block diagram illustrating a configuration of main components of the in-vehicle device 30 according to the present embodiment. The in-vehicle device 30 includes an electronic control unit (ECU) 31, an external environment recognition sensor 32, a position measurement sensor 33, a vehicle speed sensor 34, a temperature sensor 35, a wiper switch 36, and a telematic control unit (TCU) 37.

The external environment recognition sensor 32 includes: a camera 32a, which includes an imaging element such as a CCD or a CMOS, and which images surroundings (forward, rearward, and lateral sides) of the vehicle 20; a LiDAR 32b, which measures a distance from the vehicle 20 to an obstacle in the surroundings; and a radar 32c, which detects another vehicle, an obstacle, or the like in the surroundings of the vehicle 20. The external environment recognition sensor 32 functions as a division line recognition sensor and an inter-vehicle distance recognition sensor, by using any of the camera 32a, the LiDAR 32b, and the radar 32c or a combination of them. The division line recognition sensor recognizes a division line that defines a vehicle lane on which the vehicle 20 travels, based on a captured image by the camera 32a. The inter-vehicle distance recognition sensor recognizes an inter-vehicle distance between the vehicle 20 and a vehicle on a forward side of the vehicle 20, based on the captured image by the camera 32a and a detection value of the LiDAR 32b. The configurations of the division line recognition sensor and the inter-vehicle distance recognition sensor are not limited to them. For example, in a case where the camera 32a and the LiDAR 32b are also installed on a rear part of the vehicle 20, the inter-vehicle distance recognition sensor may recognize the inter-vehicle distance between the vehicle 20 and a vehicle on a rearward side of the vehicle 20. The external environment recognition sensor 32 may include a sensor for recognizing an external environment other than the division line and the inter-vehicle distance.

The position measurement sensor (a GNSS unit) 33 is, for example, a GPS sensor, receives a position measurement signal that has been transmitted from a GPS satellite, and detects an absolute position (latitude, longitude, and the like) of the vehicle 20. Note that the position measurement sensor 33 includes not only a GPS sensor but also a sensor for measuring positions using radio waves transmitted from satellites of various nations called GNSS satellites including quasi-zenith orbit satellites. The vehicle speed sensor 34 detects a traveling speed of the vehicle 20. The wiper switch 36 is a switch for switching an operation state of a wiper (a window wiper), not illustrated, installed on the windshield and the rear glass of the vehicle 20. When the wiper switch 36 is in an on (ON) state, the wiper operates, and when the wiper switch is in an off (OFF) state, the wiper stops.

As illustrated in FIG. 2, the ECU 31 includes a computer including a processing unit 310 such as a CPU, a memory unit 320 such as a ROM and a RAM, and another peripheral circuit, not illustrated, such as an I/O interface. By executing a program stored beforehand in the memory unit 320, the processing unit 310 functions as a sensor value acquisition unit 311, a sensor error detection unit 312, a wiper operation state acquisition unit 313, and a communication control unit 314.

The sensor value acquisition unit 311 acquires, from the respective sensors 32 to 35, pieces of information (values) that have been detected by the respective sensors 32 to 35. In detail, the sensor value acquisition unit 311 acquires, in a predetermined cycle, the position and shape of the division line that has been detected by the external environment recognition sensor 32, the inter-vehicle distance that has been detected by the external environment recognition sensor 32, the absolute position of the vehicle 20 that has been detected by the position measurement sensor 33, the traveling speed that has been detected by the vehicle speed sensor 34, and the temperature outside the vehicle (an outside air temperature) that has been detected by the temperature sensor 35.

The sensor error detection unit 312 detects a recognition error (a measurement error) of the external environment recognition sensor 32, based on a signal output from the external environment recognition sensor 32. If the visibility on a forward side of the vehicle 20 is degraded due to snowfalls, it will not be possible to accurately measure the position or shape of the division line based on the captured image by the camera 32a, in some cases. In such cases, the external environment recognition sensor 32 outputs an error signal indicating that the division line is not measurable. Similarly, while it is snowing, the external environment recognition sensor 32 is not capable of accurately measuring the distance to another vehicle in the surroundings of the vehicle 20 because of a malfunction (erroneous detection of the distance, or the like) of the LiDAR 32b, in some cases. In such cases, the external environment recognition sensor 32 outputs an error signal indicating that the inter-vehicle distance is not measurable. Upon receipt of the error signal output from the external environment recognition sensor 32, the sensor error detection unit 312 detects a measurement error.

The wiper operation state acquisition unit 313 detects the operation state of the wiper, based on the ON/OFF state of the wiper switch 36.

When the sensor error detection unit 312 detects the measurement error, the communication control unit 314 transmits driving information including information of the measurement error that has been detected (hereinafter, referred to as measurement error information) to the information providing apparatus 10 via the TCU 37. In addition to the measurement error information, the driving information includes detected date and time information indicating the date and time when the measurement error was detected, and detected position information indicating a sensor value of the position measurement sensor 33 (the absolute position of the vehicle 20) that has been acquired by the sensor value acquisition unit 311, when the measurement error is detected. In addition, the driving information includes wiper operation information that indicates a wiper operation state when the measurement error is detected and that has been acquired by the wiper operation state acquisition unit 313. Note that the driving information may include a vehicle ID (vehicle identification information) with which the vehicle 20 is identifiable.

Figure 3:
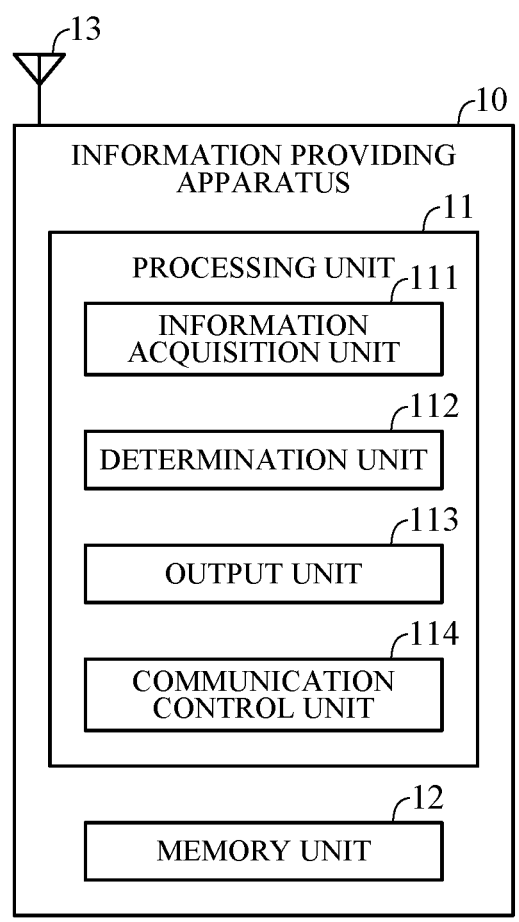
FIG. 3 is a block diagram illustrating a configuration of main components of the information providing apparatus of FIG. 1.

FIG. 3 is a block diagram illustrating a configuration of main components of the information providing apparatus 10 according to the present embodiment. The information providing apparatus 10 includes a computer including a processing unit 11 such as a CPU, a memory unit 12 such as a ROM and a RAM, a communication unit 13, and another peripheral circuit, not illustrated, such as an I/O interface. The memory unit 12 stores map information including a map of roads (hereinafter, referred to as a road map) and various types of information to be processed by the processing unit 11.

By executing a program stored in the memory unit 12, the processing unit 11 functions as an information acquisition unit 111, a determination unit 112, an output unit 113, and a communication control unit 114.

The information acquisition unit 111 acquires driving information. In more detail, the information acquisition unit 111 receives the driving information from the in-vehicle device 30 of each of the plurality of vehicles 20 (20-1, 20-2, . . . , 20-n) traveling on the road, via the communication control unit 114. Note that in a case where the vehicle ID is included in the driving information, the information acquisition unit 111 is capable of identifying the vehicle 20, which is a transmission source of the driving information, based on the vehicle ID. The information acquisition unit 111 stores the driving information that has been received from the plurality of vehicles 20 (the in-vehicle devices 30), in the memory unit 12. When the communication control unit 114 receives an output instruction to output snowfall information, the information acquisition unit 111 reads, from the memory unit 12, the driving information in which the detected date and time of a measurement error indicated by the detected date and time information is within a designated period from a current time point. The snowfall information will be described later. The output instruction of the snowfall information is transmitted from a terminal of a road management company or the like. The designated period can be set by a user, and information indicating the designated period is included in the output instruction of the snowfall information.

In addition, the information acquisition unit 111 reads map information from the memory unit 12, and acquires a road map included in the map information. In more detail, when the communication control unit 114 receives the output instruction of the snowfall information, the information acquisition unit 111 reads the road map including a designated region from the memory unit 12. The designated region can be set by the user, and information indicating the designated region is included in the output instruction of the snowfall information. Note that it may be possible to set a plurality of designated regions. For example, A city, B city, C city, and D city may be set as the designated regions in FIG. 5 to be described later.

Figure 4:
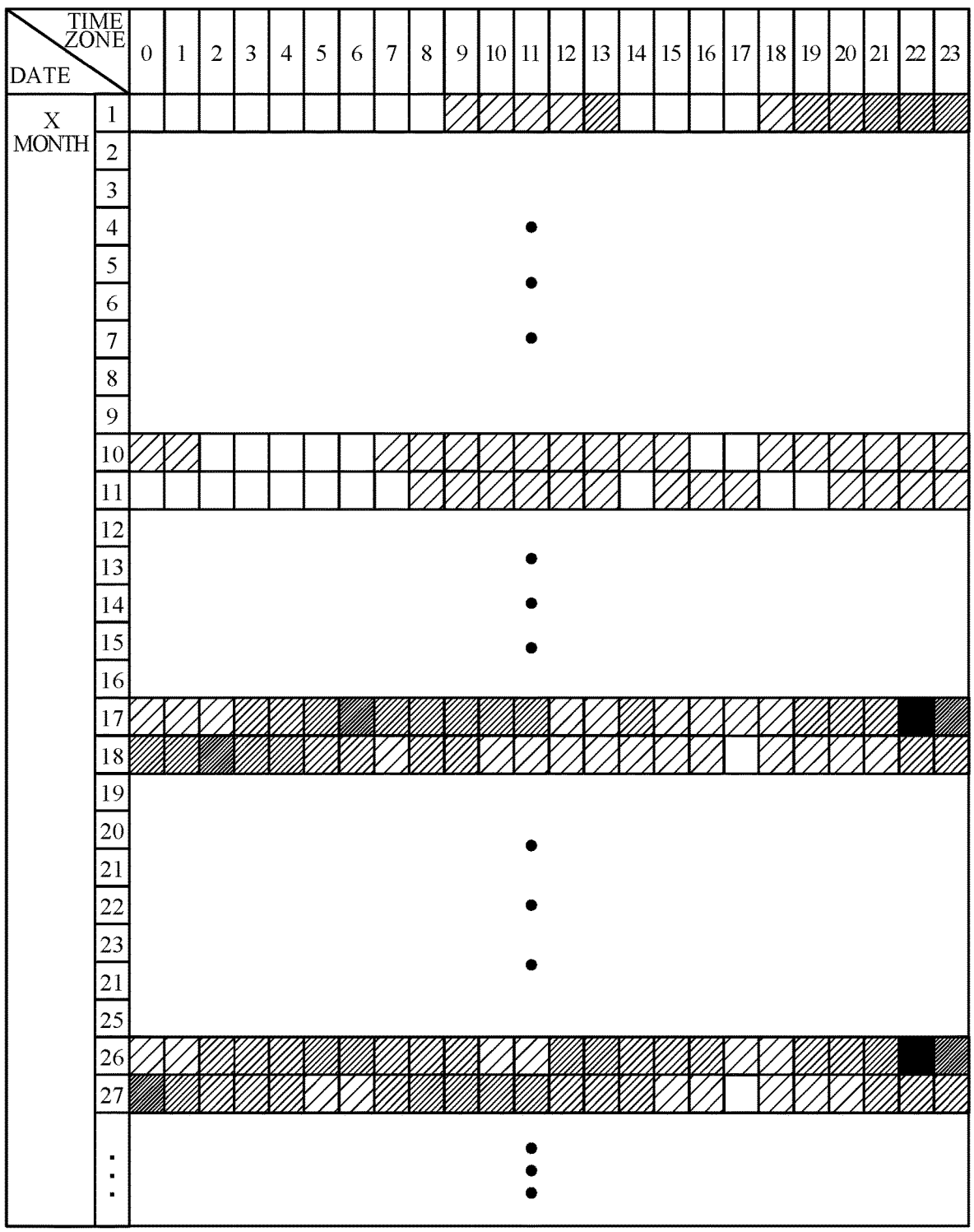
FIG. 4 is a diagram illustrating aggregate results of measurement errors.

Here, a correlation between a measurement error by the external environment recognition sensor 32 and the snowfall will be described. FIG. 4 is a diagram illustrating aggregate results of measurement errors, in detail, aggregate results of measurement error information that has been acquired from the plurality of vehicles 20, which have traveled on roads in A city in month X of a certain year. In the table of FIG. 4, the number of pieces (total) of driving information (measurement error information) that have been received by the information providing apparatus 10 from the vehicle 20 (20-1, 20-2, . . . , 20-n) are recorded for every hour on every day. In the table of FIG. 4, a time zone in which the total number of the measurement error information is closer to a maximum value (MAX value) is displayed in a darker shade. The maximum value (MAX value) is a largest value among the aggregate results in the unit of one hour in month X. FIG. 4 illustrates aggregate results of a 1st day when snowfall started from night, 10th to 11th days when no snowfall occurred, 17th to 18th days when the snowfall started from early morning and the snowfall continued until next morning, and 26th to 27th days when the snowfall started in the morning and the snowfall continued to evening of the next day. Note that for simplification of the drawings and description, in FIG. 4, illustrations of the aggregate results of the days other than those described above are omitted.

Referring to the aggregate results of the 1st day when the snowfall started from night in FIG. 4, it can be understood that there are a large number of received pieces of measurement error information in a night time zone (21:00 to 23:00). Referring to the aggregate results of 10th to 11th days when no snowfall occurred, it can be understood that there is a small number or zero of received pieces of measurement error information throughout the day on both days. Referring to the aggregate results of 17th to 18th days and 26th to 27th days when the snowfall continued for a long time, it can be understood that there are a large number of received pieces of measurement error information in a time zone while the snowfall was continuing. As described above, since a measurement error is likely to occur in the external environment recognition sensor 32 while it is snowing, the correlation appears between the snowfall and the number of received pieces of measurement error information as illustrated in FIG. 4. Therefore, the presence or absence of an occurrence of snowfall can be predicted, based on an occurrence of a measurement error by the external environment recognition sensor 32.

Therefore, when the determination unit 112 recognizes that a measurement error has occurred in the external environment recognition sensor 32, while the vehicle 20 is traveling in a predetermined region (the above-described designated region) on the road map, the determination unit 112 determines that the snowfall has occurred in the predetermined region. In this situation, the determination unit 112 determines whether the absolute position of the vehicle 20 indicated by the detected position information included in the driving information is included in a predetermined region on the road map, based on the road map and the driving information that have been acquired by the information acquisition unit 111. Then, in a case where the absolute position of the vehicle 20 indicated by the detected position information is included in the predetermined region, the determination unit 112 recognizes that a measurement error has occurred in the external environment recognition sensor 32, while the vehicle 20 is traveling in the predetermined region.

Note that while the wiper of the vehicle 20 is stopped, it is assumed that there is a low possibility of snowfall in the traveling position of the vehicle 20. Therefore, the determination unit 112 may determine whether the snowfall has occurred in the predetermined region, based on the operation state of the wiper of the vehicle 20 traveling in the predetermined region, in addition to the measurement error by the external environment recognition sensor 32. In more detail, the determination unit 112 may determine whether the snowfall has occurred in the predetermined region, on condition that the wiper of the vehicle 20 traveling in the predetermined region is operating. In this case, when the information acquisition unit 111 acquires the driving information, the determination unit 112 refers to the wiper operation information included in the driving information, and recognizes the operation state of the wiper of the vehicle 20. Then, when the wiper of the vehicle 20 is in operation, the determination unit 112 determines whether the snowfall has occurred in the predetermined region, based on the measurement error information and the detected position information included in the driving information.

When the communication control unit 114 receives an output instruction, the output unit 113 generates snowfall information in which a determination result by the determination unit 112 is associated with the road map that has been acquired by the information acquisition unit 111, and outputs the snowfall information that has been generated.

The communication control unit 114 controls the communication unit 13 to transmit and receive data to and from an external device or the like. Specifically, the communication control unit 114 acquires map information and the like from various servers connected with the communication network 2 on a regular basis or at a given timing. The communication control unit 114 stores, in the memory unit 12, information that has been acquired from various servers. In addition, the communication control unit 114 transmits and receives data (driving information and the like) to and from the in-vehicle device 30 of the vehicle 20 through the communication network 2. Furthermore, the communication control unit 114 transmits and receives data to and from a terminal of a user (hereinafter, referred to as a user terminal) of a road management company or the like. In more detail, the communication control unit 114 receives an output instruction of the snowfall information transmitted from the user terminal through the communication network 2. When the output unit 113 outputs the snowfall information in accordance with the output instruction, the communication control unit 114 transmits the snowfall information to the user terminal that is a transmission source of the output instruction through the communication network 2. In a case where the snowfall information is information that can be displayed on a display device such as a display, the user operates the user terminal to display the snowfall information on a display included in the user terminal or connected with the user terminal, and is thus able to confirm the presence or absence of snowfall in the predetermined region.

Figure 5:
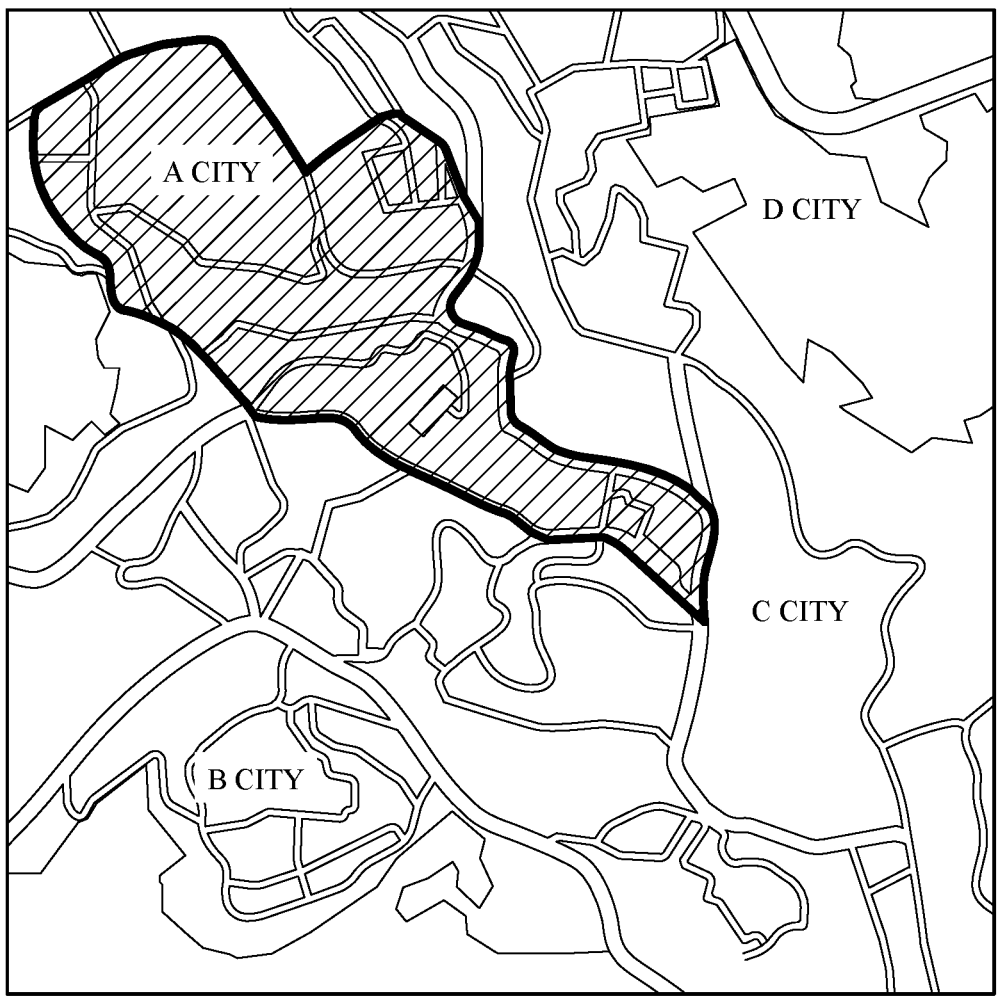
FIG. 5 is a diagram illustrating a display example of weather information.

FIG. 5 is a diagram illustrating a display example of weather information (snowfall information) output by the output unit 113. In the example of FIG. 5, the snowfall information at the time when the determination unit 112 determines that snowfall has occurred in A city is illustrated as an example. In FIG. 5, a road map of a region including A city in which the determination unit 112 has determined that the snowfall had occurred is displayed, and a region corresponding to A city is displayed in a highlighted manner (shaded display in the example of FIG. 5). This enables the user to recognize that the snowfall has occurred in the predetermined region (A city in the example of FIG. 5).

Figure 6A:
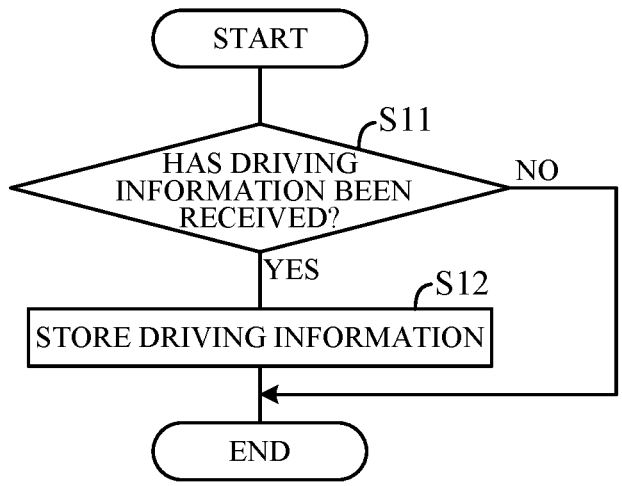
FIG. 6A is a flowchart illustrating an example of processing performed by the processing unit of FIG. 3.
Figure 6B:
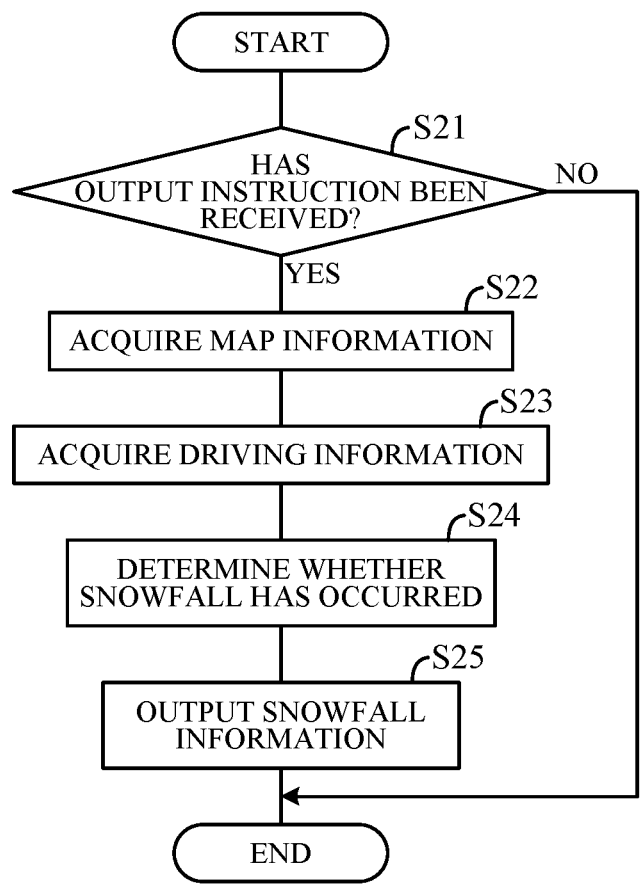
FIG. 6B is a flowchart illustrating another example of processing performed by the processing unit of FIG. 3.

FIGS. 6A and 6B are flowcharts illustrating an example of processing performed by the processing unit 11 (CPU) of the information providing apparatus 10 in accordance with a predetermined program. The processing illustrated in the flowcharts of FIGS. 6A and 6B is repeated at a predetermined cycle, while the information providing apparatus 10 is activated.

FIG. 6A illustrates a flowchart of reception processing of driving information. First, in step S11, it is determined whether the driving information has been received from the in-vehicle device 30 of the vehicle 20. In a case where a negative determination is made in step S11, the processing ends. In a case where a positive determination is made in step S11, the driving information received in step S11 is stored in the memory unit 12 in step S12.

FIG. 6B illustrates a flowchart illustrating output processing of snowfall information. First, in step S21, it is determined whether an output instruction of the snowfall information has been input (received). In a case where a negative determination is made in step S21, the processing ends. In a case where a positive determination is made in step S21, map information is read from the memory unit 12, and a road map is acquired from the map information in step S22. In this situation, the road map including a region designated (a designated region) by the output instruction received in step S21 is acquired. In step S23, driving information of the vehicle 20 is acquired from the memory unit 12. In this situation, the driving information in which the detected date and time of a measurement error indicated by the detected date and time information is within a designated period from the current time point is acquired. In step S24, it is determined whether the snowfall has occurred in a predetermined region, based on the road map acquired in step S22 and the measurement error information and the detected position information included in the driving information acquired in step S23. In step S25, snowfall information including the determination result in step S24 is generated, and the snowfall information that has been generated is output. The snowfall information is output to a user terminal that is a transmission source of the output instruction of the snowfall information or a terminal that is a predetermined output destination through the communication network 2.

According to embodiments of the present invention, the following operations and effects are achievable.

(1) The information providing apparatus 10 includes: the information acquisition unit 111, which acquires driving information and map information, the driving information including position information of the vehicle 20, which is traveling, and measurement error information indicating an occurrence of a measurement error output by the external environment recognition sensor 32 for measuring an external environment of the vehicle 20, the driving information being acquired from the in-vehicle device 30 of the vehicle 20 through the communication unit 13, the map information including a road map from the memory unit 12; the determination unit 112, which determines whether a snowfall has occurred in a predetermined region of the road map, based on the driving information and the map information that have been acquired by the information acquisition unit 111; and the output unit 113, which outputs information in which a determination result of the determination unit 112 is associated with the road map. When recognizing that a measurement error has occurred while the vehicle 20 is traveling in the predetermined region, based on the map information and the driving information, the determination unit 112 determines that the snowfall has occurred in the predetermined region. In this manner, the external environment recognition sensor 32 determines whether the snowfall has occurred, based on the information at the time when the measurement error has occurred, and thus the amount of information used for determining the presence or absence of the snowfall can be reduced. As a result, the processing load of the information providing apparatus 10 can be reduced, and the storage area of the information providing apparatus 10 can be saved. Accordingly, with a simple configuration, the snowfall information can be accurately provided for the user. In addition, the user is able to make a detour or make a preliminary preparation (attachment of a studless winter tire) in preparation for snowfall, based on the snowfall information that has been provided in this manner, and traffic safety can be improved.

(2) The driving information further includes operation information indicating an operation state of the wiper of the vehicle 20. The determination unit 112 determines whether the snowfall has occurred in the predetermined region, based on the map information and the driving information, on condition that the wiper of the vehicle 20, which is traveling in the predetermined region, is operating. Accordingly, the determination accuracy of the presence or absence of the occurrence of the snowfall can be improved.

(3) The external environment recognition sensor 32 detects an inter-vehicle distance between the vehicle 20 and at least one of a vehicle on a forward side and a vehicle on a rearward side of the vehicle 20. The measurement error information includes information indicating an occurrence of a measurement error of the inter-vehicle distance by the external environment recognition sensor 32. Accordingly, it becomes possible to determine the presence or absence of the occurrence of the snowfall using an inter-vehicle distance recognition sensor included as standard equipment in a vehicle having an advanced driver-assistance systems (ADAS) function or a vehicle having a self-driving function. As a result, the configuration of the apparatus can be further simplified.

(4) The external environment recognition sensor 32 detects a division line of a road on which the vehicle 20 is traveling. The measurement error information includes information indicating an occurrence of a measurement error of the division line by the external environment recognition sensor 32. Accordingly, it becomes possible to determine the presence or absence of the occurrence of the snowfall using a division line recognition sensor included as standard equipment in the vehicle having the ADAS function or the vehicle having the self-driving function. As a result, the configuration of the apparatus can be further simplified.

The above embodiments can be modified into various forms. Hereinafter, modifications will be described. In the above embodiments, when the determination unit 112 recognizes that a measurement error by the external environment recognition sensor 32, which is an in-vehicle sensor, has occurred, based on the map information and the driving information, while the vehicle 20 is traveling in a predetermined region, the determination unit 112 is configured to determine that the snowfall has occurred in the predetermined region. However, as the traveling speed of the vehicle 20 becomes faster, there is a possibility that the recognition accuracy of the external environment recognition sensor 32 decreases. Hence, the determination unit 112, as a calculation unit, may calculate the reliability of the measurement error information, based on the traveling speed of the vehicle 20. Then, the determination unit may determine that the snowfall has occurred, in a case where the calculated reliability is equal to or higher than a predetermined degree. In this case, the communication control unit 314 of the in-vehicle device 30 causes a sensor value (speed information) of the vehicle speed sensor 34 that has been acquired by the sensor value acquisition unit 311 to be included in the driving information to be transmitted to the information providing apparatus 10. The calculation unit calculates the reliability to be higher, as the traveling speed of the vehicle 20 indicated by the speed information included in the driving information becomes lower. Accordingly, the determination accuracy of the presence or absence of the occurrence of the snowfall can be further improved.

Note that when the vehicle 20 is stopped at the time of snowfall, snow is likely to adhere or pile up onto the windshield or the rear glass. In addition, as the stopped period becomes longer, its possibility is higher. Therefore, the calculation unit may detect a stopped state of the vehicle 20, based on the driving information (the speed information), and when the stopped state is detected continuously for a predetermined period or more, the calculation unit may calculate the reliability to be lower, as the duration is longer. Note that the calculation unit determines that the vehicle 20 is in the stopped state, in a case where the traveling speed of the vehicle 20 indicated by the driving information (the speed information) is zero. Accordingly, the presence or absence of the occurrence of the snowfall can be accurately determined, also while the vehicle 20 is stopped. Note that the calculation unit may determine the stopped state of the vehicle 20, based on information other than the speed information.

In addition, as illustrated in the aggregate results of FIG. 4, as the number of reception times of the measurement error information increases, that is, when the measurement errors by the external environment recognition sensors 32 occur in a larger number of the vehicles 20, it is assumed that there is a high possibility that snowfall has occurred in the region where those vehicles 20 are traveling. Therefore, the calculation unit may calculate the reliability to be higher, as there are a larger number of times of measurement errors that have occurred in the external environment recognition sensor 32 (the number of pieces of measurement error information that have been received by the information providing apparatus 10 from each vehicle 20), while the vehicle 20 is traveling in a predetermined area.

In addition, the measurement error by the external environment recognition sensor 32 may occur due to a factor other than snowfall, for example, rainfall. For this reason, in a case where the weather in a predetermined region has a low possibility of snowfall, in more detail, on condition that the outside air temperature in the predetermined region is equal to or lower than a temperature indicating the possibility of snowfall (for example, 4 degrees Celsius), the determination unit may determine whether the snowfall has occurred in the predetermined region. In this case, the communication control unit 314 of the in-vehicle device 30 causes the sensor value (outside air temperature information) of the temperature sensor 35 that has been acquired by the sensor value acquisition unit 311 to be included in the driving information to be transmitted to the information providing apparatus 10. The information acquisition unit 111 receives the driving information including the outside air temperature information that has been transmitted from the vehicle 20 (the in-vehicle device 30). That is, the information acquisition unit 111 also functions as an outside air temperature acquisition unit. The determination unit determines whether the snowfall has occurred in the predetermined region, based on the measurement error information included in the driving information, on condition that the outside air temperature in the predetermined region is equal to or lower than the temperature indicating the possibility of snowfall, based on the map information and the driving information (the outside air temperature information and the detected position information) that have been acquired by the information acquisition unit 111. In this case, when the information acquisition unit 111 acquires the driving information, the determination unit recognizes the outside air temperature of the vehicle 20, with reference to the outside temperature information included in the driving information. Then, in a case where the outside air temperature of the vehicle 20 is equal to or lower than the temperature indicating the possibility of the snowfall, the determination unit determines whether the snowfall has occurred in the predetermined region, based on the measurement error information and the detected position information included in the driving information. Note that the outside air temperature acquisition unit may acquire, as the outside air temperature information, a predicted value of a current outside air temperature in a predetermined region from an external server apparatus that provides (distributes) weather forecast data or the like via the communication control unit 314.

In addition, in the above embodiments, the determination unit 112 is configured to determine whether the snowfall has occurred in the predetermined region, based on the map information and the driving information, on condition that the wiper of the vehicle 20 traveling in the predetermined region is operating. However, even though it is not snowing, but in a case where snow piles up on the road surface and covers a division line, the external environment recognition sensor 32 (the division line recognition sensor) is likely to output an error signal indicating that the division line is not measurable. Therefore, while the vehicle 20 is traveling in a predetermined region and while the wiper of the vehicle 20 is stopped (a case where the possibility of snowfall is low), based on the map information and the driving information, and in a case where the determination unit recognizes that a measurement error has occurred, the determination unit may determine that snow coverage remains on the road on which the vehicle 20 is traveling. In this case, the output unit may cause a determination result of the presence or absence of the snow coverage by the determination unit 112 to be included in the snowfall information. When recognizing that a measurement error has occurred while the wiper of the vehicle 20 is stopped, the determination unit may determine whether the snowfall has occurred within a predetermined period (24 hours, several days, or the like) before the detected date and time of such a measurement error, so that the presence or absence of the snow coverage can be determined more accurately. Specifically, the determination unit acquires, from the memory unit 12, the driving information in which the detected date and time of the measurement error indicated by the detected date and time information is within a predetermined period, and determines whether the snowfall has occurred in a predetermined region within the predetermined period. Then, when determining that the snowfall has occurred in the predetermined region within the predetermined period, the determination unit may determine that the snow coverage remains on the road on which the vehicle 20 is traveling. In addition, in the weather information of FIG. 5, the output unit may generate weather information so that a region that the determination unit has determined that the snow coverage has occurred is displayed in a highlighted manner (for example, dotted display) that is a different display mode from a region that the determination unit has determined that the snowfall has occurred. Accordingly, not only the snowfall information but also the snow coverage information can be provided for users.

In addition, in the above embodiments, when the communication control unit 114 receives the output instruction of the snowfall information, the information acquisition unit 111, as a driving information acquisition unit, reads, from the memory unit 12, the driving information in which the detected date and time of the measurement error indicated by the detected date and time information is within the designated period from the current time point. However, the information acquisition unit may be configured to read the driving information in which the detected date and time of the measurement error indicated by the detected date and time information is included between a first time point in the past and a second time point in the past from the first time point. In this case, the first time point and the second time point may be settable by a user. That is, information indicating the first time point and the second time point may be included in the output instruction of the snowfall information. According to such a configuration, the user is able to confirm the presence or absence of the occurrence of the snowfall on a designated date and time in the past (for example, the same date one year ago).

Furthermore, in the above embodiments, the output unit 113 is configured to output the snowfall information to the user terminal. However, in a case where the information providing apparatus 10 includes an output device such as a display, the output unit may output the snowfall information to such an output device. In addition, in the above embodiments, the output unit 113 is configured to generate, as the snowfall information, the information (FIG. 5) in which a determination result of the determination unit 112 is associated with the road map that has been acquired by the information acquisition unit 111 as the map information acquisition unit. However, as long as the user is able to determine the presence or absence of the snowfall in a predetermined region, the snowfall information may be generated in a different mode from the mode of FIG. 5.

The above embodiment can be combined as desired with one or more of the above modifications. The modifications can also be combined with one another.

According to the present invention, with a simple configuration, the weather information can be accurately provided.

Above, while the present invention has been described with reference to the preferred embodiments thereof, it will be understood, by those skilled in the art, that various changes and modifications may be made thereto without departing from the scope of the appended claims.

What is claimed is:

1. An information providing apparatus comprising: a communication unit communicable to an external device; and a microprocessor and a memory coupled to the microprocessor, wherein the memory stores a map information including a road map, and the microprocessor is configured to perform: acquiring from an in-vehicle device mounted on a vehicle which is traveling and including a first sensor detecting a position of the vehicle and a second sensor measuring an external environment of the vehicle via the communication unit, driving information including
   position information indicating the position of the vehicle detected by the first sensor and measurement error information indicating an occurrence of a measurement error output by the second sensor, and further acquiring the map information from the memory;
   determining whether a snowfall has occurred in a predetermined region of the road map, based on the driving information and the map information acquired in the acquiring; and outputting to an output apparatus via the communication unit, information in which a determination result in the determining is associated with the road map, wherein the microprocessor is configured to perform the determining including when recognizing that the measurement error has occurred while the vehicle is traveling in the predetermined region, based on the map information and the driving information, determining that the snowfall has occurred in the predetermined region,
   wherein the microprocessor is further configured to perform calculating a reliability of the measurement error information, the driving information further includes speed information indicating a traveling speed of the vehicle, and the microprocessor is configured to perform: the calculating including calculating the reliability to be higher, as the traveling speed of the vehicle indicated by the speed information becomes lower;
   and the determining including determining that the snowfall has occurred in the predetermined region when it is recognized that the measurement error has occurred while the vehicle is traveling in the predetermined region, based on the map information and the driving information, and the reliability of the measurement error information included in the driving information is equal to or higher than a predetermined degree.

2. The information providing apparatus according to claim 1, wherein
   the driving information further includes operation information indicating an operation state of a wiper of the vehicle, and
   the microprocessor is configured to perform the determining including determining whether the snowfall has occurred in the predetermined region, based on the map information and the driving information, on condition that the wiper of the vehicle, which is traveling in the predetermined region, is operating.

3. The information providing apparatus according to claim 1, wherein the microprocessor is configured to perform the calculating including when a stopped state of the vehicle detected based of the speed information is detected continuously for a predetermined period or more, calculating the reliability lower the longer a duration of the stopped state is.

4. The information providing apparatus according to claim 1, wherein
the microprocessor is configured to further perform
acquiring outside air temperature information indicating an outside air temperature or a predicted value of the outside air temperature, and
the microprocessor is configured to perform
the determining including, in a case where the outside air temperature indicated by the outside air temperature information is equal to or lower than a temperature indicating a possibility of the snowfall, determining whether the snowfall has occurred in the predetermined region based on the map information and the driving information.

5. The information providing apparatus according to claim 1, wherein
the second sensor detects an inter-vehicle distance between the vehicle and at least one of a forward vehicle and a rearward vehicle, and
the measurement error information includes information indicating an occurrence of a measurement error of the inter-vehicle distance output by the second sensor.

6. The information providing apparatus according to claim 1, wherein
the second sensor detects a division line of a road on which the vehicle is traveling, and
the measurement error information includes information indicating an occurrence of a measurement error of the division line by the second sensor.

7. The information providing apparatus according to claim 2, wherein
the microprocessor is configured to perform
the determining including when recognizing that the measurement error has occurred while the vehicle is traveling in the predetermined region and the wiper is stopped, based on the map information and the driving information, determining that a snow coverage remains on a road on which the vehicle is traveling.

8. An information providing system including an in-vehicle device mounted on a vehicle and an information providing apparatus communicable to the in-vehicle device, wherein the in-vehicle device includes a first sensor detecting a position of the vehicle and a second sensor measuring an external environment of the vehicle, and the information providing apparatus includes a microprocessor, a memory coupled to the microprocessor, and a communication unit, and wherein the memory stores a map information including a road map, and the microprocessor is configured to perform:

acquiring from the in-vehicle device via the communication unit,
driving information including position information indicating the position of the vehicle detected by the first sensor and measurement error information indicating an occurrence of a measurement error output by the second sensor, and further acquiring the map information from the memory; determining whether a snowfall has occurred in a predetermined region of the road map, based on the driving information and the map information acquired in the acquiring; and outputting to an output apparatus via the communication unit, information in which a determination result in the determining is associated with the road map, wherein the microprocessor is configured to perform the determining including when recognizing that the measurement error has occurred while the vehicle is traveling in the predetermined region, based on the map information and the driving information, determining that the snowfall has occurred in the predetermined region,
wherein the microprocessor is further configured to perform calculating a reliability of the measurement error information, the driving information further includes speed information indicating a traveling speed of the vehicle, and the microprocessor is configured to perform: the calculating including calculating the reliability to be higher, as the traveling speed of the vehicle indicated by the speed information becomes lower;
and the determining including determining that the snowfall has occurred in the predetermined region when it is recognized that the measurement error has occurred while the vehicle is traveling in the predetermined region, based on the map information and the driving information, and the reliability of the measurement error information included in the driving information is equal to or higher than a predetermined degree.

* * * * *